United States Patent [19]

Nelson et al.

[11] 4,369,195

[45] Jan. 18, 1983

[54] EXTRUSION TEXTURIZATION OF FULL-FAT SOYBEAN AND PRODUCT THEREOF

[75] Inventors: Alvin I. Nelson, Champaign; Johnnie S. Leigh, Urbana, both of Ill.

[73] Assignee: The University of Illinois Foundation, Urbana, Ill.

[21] Appl. No.: 60,362

[22] Filed: Jul. 25, 1979
(Under 37 CFR 1.47)

[51] Int. Cl.³ .............................................. A23J 3/00
[52] U.S. Cl. ...................................... 426/62; 426/104; 426/460; 426/516; 426/634; 426/656; 426/802
[58] Field of Search ................... 426/46, 62, 104, 634, 426/652, 656, 453, 454, 457, 459, 460, 464, 473, 507, 516, 517, 518, 802

[56] References Cited

U.S. PATENT DOCUMENTS

| | | | |
|---|---|---|---|
| 4,038,431 | 7/1977 | Hildebolt | 426/656 X |
| 4,075,361 | 2/1978 | Oberg | 426/634 X |
| 4,095,001 | 6/1978 | Hildebolt et al. | 426/656 |

FOREIGN PATENT DOCUMENTS 478295  8/1975  Australia .......................... 426/656

OTHER PUBLICATIONS

Altschul, Processed Plant Protein Foodstuffs, 1958, p. 400.
Smith, *Textures by Extrusion Processing*, Prepared for Delivery in Short Course for Fabricated Food, Las Vegas, Nevada, 3-28-74, pp. 1-20.

*Primary Examiner*—Arthur L. Corbin
*Attorney, Agent, or Firm*—Mathew L. Kalinowski

[57] ABSTRACT

A textured soybean product is produced from full-fat soybean by hydrating whole soybean by treatment with a dilute alkaline solution; mixing the hydrated soybean with full-fat soy flour and equilibrating the moisture content thereof; and passing the mixture through an extrusion cooker. The textured product has excellent flavor, color, and appearance, and can be formulated into an all-vegetable ground meat analogue or it can be used as an extender in blends with ground meat.

12 Claims, No Drawings

EXTRUSION TEXTURIZATION OF FULL-FAT SOYBEAN AND PRODUCT THEREOF

This invention relates to a textured product from full-fat soybean and to a method for producing it.

Preparation of textured soybean protein by extrusion cooking is well known in the art. The principal ingredient for prior art processes is soy flake or flour from which most of the fat content has been removed by solvent extraction. Conventionally, soybeans are cleaned, cracked, dehulled, and the hulls are discarded, which leaves the soy cotyledon particles. These are conditioned, flaked, and defatted by solvent extraction. After desolventizing, the extracted material is ground to provide a defatted soy flour. To this flour are added coloring, flavoring, and a small amount of water, and the mixture is extruded to yield the textured soybean protein. For successful texturization in such processes, the mixture is required to have a minimum of 50% of protein and a maximum of 1.5% of fat. Additional details of such prior art processes are disclosed in Cereal Science Today, October 1974, and in Smith, O. B., Versatility of Texturizing by Extrusion Cooking, 67th Annual Meeting, American Institute of Chemical Engineers, Washington, D.C., Dec. 2, 1974.

It is an object of this invention to provide a textured soybean product from raw, whole, full-fat soybeans which typically contain less than 50% of protein but which have a protein to carbohydrate ratio of at least 1.0.

It is another object of this invention to provide a textured soybean product from full-fat soybean, thereby eliminating the need for solvent-extraction processing.

It is a further object of this invention to provide a textured soybean product from full-fat soybean that can be formulated into an all-vegetable meat analogue or used as an extender in blends with meat.

It is still a further object to provide textured soybean products from full-fat soybean that have excellent flavor, lack of off-flavors, and good color and appearance.

These and object objects will be found in the following description of the invention.

In accordance with this invention, a textured soybean product from full-fat raw soybean is prepared by the steps of:

(a) soaking the raw full-fat soybean in a dilute alkaline solution for a time sufficient to hydrate the soybean and gel the protein content within the cotyledon tissue, thereby trapping the oil in situ;
(b) forming a mixture of the hydrated soybean with from about 1 to about 3 parts by weight of full-fat soy flour;
(c) equilibrating the moisture content of the mixture; and
(d) passing the equilibrated mixture through an extrusion cooker to yield the texturized soybean product.

The soybean utilized in step (a) can be whole raw soybean, raw full-fat soy flour, or a mixture of the two. Soybeans suitable for use in this process are, for example, the Corsoy variety grown in Champaign County, Ill. Such soybeans contain about 40% protein, 33% carbohydrate and about 22% oil which provides a protein to carbohydrate ratio of about 1.2. It is critical for successful extrusion in the process of this invention that the protein to carbohydrate ratio be at least about 1.0, and preferably at least about 1.1. It is understood that protein-rich materials derived from vegetable sources, or synthetic proteins from hydrocarbons or alcohols, can be used as a supplementary material in the process. For example, suitable protein material can be derived from yeast cultured in a hydrocarbon or alcohol medium as disclosed in Ridgway et al., U.S. Pat. No. 3,865,691; Ridgway et al., U.S. Pat. No. 3,847,750; and Allen et al., U.S. Pat. No. 4,019,962. Although not necessary for the successful practice of the invention, addition of such materials enriches the extrudate with respect to protein content and enhances texturization of the product. Materials such as wheat gluten, soy isolate, and soy concentrate can be utilized advantageously as replacement for up to about 50% of the ground full-fat soy flour.

The alkaline solution required for hydrating the soybean in step (a) of the process is suitably an aqueous solution of NaOH, KOH, $Na_2CO_3$, or $NaHCO_3$ in concentration within the range of from about 0.1 N to about 2.0 N. Soaking at ambient temperature for about from 0.5 to about 4.5 hours is generally adequate to hydrate raw whole bean or raw full-fat flour and gel the protein therein.

Raw full-fat flour is readily obtained by conventional grinding means, for example by use of a micropulverizer hammer mill. Suitably, raw whole soybean is ground to provide a flour that will pass through a 0.010 inch screen, or finer.

The mixture of alkaline-treated soybean and full-fat flour is prepared and held for a time sufficient to equilibrate the moisture content thereof, suitably to a level within the range of from about 20 to about 30%, and preferably about 25%.

The equilibrated mixture is then texturized by passage through an extrusion cooker. Satisfactory texturizing means are provided, for example, by the Wenger X-5 extruder, the extruder section of which consists of eight barrels. In operation, the first three barrels are not heated or cooled; the last five barrels are heated with steam at from about 55 to about 90 psi. Auger speed is held at from about 600 to about 900 rpm, and feed rate is between a setting of about 6 to about 15.

The texturized extruded products produced by the above-described procedure were free from off-flavor and color, and were very good to excellent in texture which was meat-like in character. The extrudate is suitable for direct formulation into edible products or it can be dehydrated to about 10% moisture content for packaging and marketing.

The invention can be more readily understood and illustrated by reference to the following examples and procedures.

EXAMPLE 1

Raw whole soybeans were soaked in an equal weight of 0.5 N NaOH solution for 4.5 hours at room temperature. The excess of alkaline solution was drained off and the hydrated soybeans were mixed with an equal weight of raw, micropulverized full-fat flour. The mixture was allowed to equilibrate for about 30 minutes at room temperature to a moisture content of about 25%. The mixture was then extruded through the Wenger X-5 extruder under conditions described above. No oil separation was observed. The extrudate pieces obtained were of medium size with a good texture and with no alkaline odor or flavor. Analysis of the extrudate showed the characteristics listed in the following table:

|  | As is (%) | (%) Dry Basis |
| --- | --- | --- |
| Proximate Analysis | | |
| Total lipid by CHCl$_3$/NaOH extraction | 17.93 | 21.98 |
| Ash | 3.91 | 4.79 |
| Protein | 31.12 | 38.14 |
| Carbohydrate by difference | 28.62 | 35.09 |
| Moisture | 18.42 | — |
| Physical Characteristics | | |
| Maximum water absorption ml/gm extrudate | | 1.63 |
| Time for maximum rehydration, min. | | 30 |
| Nutritional Parameter | | |
| Soybean trypsin inhibitor | | Absent |

EXAMPLE 2

Raw full-fat flour of fineness to pass through a 0.010 inch screen was soaked in 1.0 N NaOH for 4.5 hours at room temperature. The flour to NaOH solution ratio was 0.91. The excess of solution was drained off and the soaked flour was mixed at room temperature with an equal weight of raw full-fat flour for a time sufficient to equilibrate the moisture content to about 25%. The mixture was then extruded through the Wenger X-5 extruder under the conditions described above. No oil separation was observed. The extrudate obtained was satisfactory in size, texture, and color.

Extrudate produced according to the procedures described above is highly suitable for the preparation of vegetable hamburger according to the following recipe:

| Whole bean, full-fat extrudate | 43.25 g |
| --- | --- |
| Soy protein fibre paste | 43.20 |
| Caramel color powder | 0.64 |
| Salt | 1.62 |
| Vegetable shortening (Hydrol 92) | 10.82 |
| Hydrolyzed vegetable protein | 8.00 |
| Beef extract F-2 | 3.00 |
| Onion powder | 4.00 |
| Tomato paste | 5.00 |

The soy protein fibre paste was made by mixing 100 g of soy protein fibre with 150 ml of 0.1 N NaOH and allowing the mixture to stand for 15 minutes. Thirty ml of 1.0 N NaOH was then added and the mixture allowed to stand for an additional 15 minutes with occasional stirring to dissolve the soy protein.

Ingredients for the vegetable hamburger were added in the following order: the extrudate was mixed with the soy protein fibre paste, and to this mix was added the hydrolyzed vegetable protein, beef extract, onion powder, and salt. After mixing the previous ingredients, caramel color, tomato paste, and Hydrol 92 were added and the mixing was repeated. Eighty gram samples of the mixture were formed into patties, which can be vacuum packed in plastic, frozen, and stored at 0° F.

The extrudate can also be blended with fresh ground beef and made into soy/beef hamburger. The ratio of beef to extrudate can vary from about 1:3 to about 3:1. A typical example was prepared according to the following recipe:

| Fresh ground beef | 50 g |
| --- | --- |
| Extrudate | 50 |
| Salt | 3 |
| Water | 5 |

It was found necessary to provide a solubilized beef paste to hold the extrudate pieces together in the beef/soy patty. The paste was prepared by blending 25 g of fresh ground beef with 3 g of salt and 5 g of water in a high speed blender. This procedure provided a solubilized, thick beef paste which was mixed with the extrudate and the remaining beef in a mixer. The mixer was made into 80 g patties. In a similar manner, patties containing 25% and 75% of beef were prepared.

Patties of the vegetable hamburger and the beef/soy hamburger, prepared as described above, were broiled on each side in a gas oven set at 200° F. for a total time of 40 minutes. The patties were then pan fried in a small amount of vegetable oil to develop browning and crust formation on oven top burners set at medium heat. Adequacy of browning and crust formation was determined visually.

The cooked patties were evaluated by an 8-member taste panel in a randomized and blindfold manner. Each patty was judged for flavor, off-flavor, texture, color, and overall acceptance on a nine point scale with 9 as excellent, 5 as just acceptable, and 1 as entirely unacceptable. The results are listed in the following table:

| Extrudate, % | Beef, % | Flavor | Off Flavor | Texture | Color | Overall Acceptance |
| --- | --- | --- | --- | --- | --- | --- |
| 0 | 100 | 5.1 | 7.6 | 7.2 | 8.3 | 7.1 |
| 25 | 75 | 7.7 | 7.9 | 8.0 | 6.3 | 7.5 |
| 50 | 50 | 7.3 | 7.2 | 7.4 | 6.5 | 7.1 |
| 75 | 25 | 7.1 | 7.1 | 6.8 | 5.9 | 6.7 |
| 100 | 0 | 7.5 | 5.5 | 6.0 | 6.8 | 6.5 |

The all beef patty had a flavor that was less preferred and a color that was more preferred than that of the 75% and 50% beef patties. There was no statistical difference in the off flavor, texture, and overall acceptance ratings of the 100%, 75%, and 50% beef patties.

Patties made from 75:25 and the 50:50 extrudate-beef blends showed no statistical difference in flavor, off flavor, texture, color, and acceptance.

The 25% beef patty was inferior to the previous three blends in color. In flavor, off flavor, and texture, it was as good as the 75% and 50% beef patties. Flavor of the 25% beef patty was statistically superior to the 100% beef patty.

Patties made entirely from extrudate were somewhat inferior to those containing beef in regard to off flavor, texture, and color. The flavor, however, was as good as that of beef-containing blends and even more acceptable than that of the 100% beef patty. All-extrudate patties, from overall considerations, were as acceptable as the 25% beef patty.

This invention has been disclosed with particular reference to certain preferred embodiments thereof, but it is understood that variations and modifications can be effected within the spirit and scope of the appended claims. It is intended that all material contained in the above description shall be interpreted in an illustrative and not in a limiting sense.

What is claimed is:

1. A textured soybean product comprising a mixture of a first soybean component, selected from the group consisting of raw full-fat whole soybean, raw full-fat soy flour and mixtures thereof, said first component having a protein to carbohydrate ratio of at least 1.0 and said first component having been soaked in a dilute alkaline solution for a time sufficient to effect hydration thereof and from about 1 to about 3 parts by weight of a second component comprising a full-fat soy flour; the mixture of the first and second components having been equilibrated with respect to its water content and having been passed through an extrusion cooker to produce the textured soybean product.

2. The product of claim 1 wherein the first component is raw full-fat whole soybean and the equilibrated mixture contains about 25% moisture.

3. The product of claim 1 wherein the first component is raw full-fat soy flour and the equilibrium mixture contains about 25% moisture.

4. The product of claim 1 wherein the second component comprises a major amount of full-fat soy flour and a minor amount of a protein selected from the group consisting of vegetable protein and protein derived from yeast cultured in a hydrocarbon or alcohol medium.

5. The product of claim 4 wherein the vegetable protein is selected from the group consisting of wheat gluten, soy isolate, and soy concentrate.

6. A method of producing a textured soybean product comprising the steps of:
   (a) soaking a first component, selected from the group consisting of raw full-fat whole soybean, raw full-fat soy flour and mixtures thereof, in a dilute alkaline solution for a time sufficient to effect hydration thereof, said first component having a protein to carbohydrate ratio of at least 1.0;
   (b) forming a mixture of the hydrated soybean with from about 1 to about 3 parts by weight of a second component comprising full-fat soy flour;
   (c) equilibrating the moisture content of the mixture; and
   (d) passing the equilibrated mixture through an extrusion cooker to produce the textured soybean product.

7. The method of claim 6 wherein the first component is raw full-fat whole soybean and the mixture is equilibrated to a moisture content of about 25%.

8. The method of claim 6 wherein the first component is raw full-fat soy flour and the mixture is equilibrated to a moisture content of about 25%.

9. The method of claim 6 wherein the second component comprises a major amount of full-fat soy flour and a minor amount of a protein selected from the group consisting of vegetable protein and protein derived from yeast cultured in a hydrocarbon or alcohol medium.

10. The method of claim 9 wherein the vegetable protein is selected from the group consisting of wheat gluten, soy isolate, and soy concentrate.

11. The method of claim 6 wherein the alkaline solution is an aqueous solution of an alkali metal hydroxide, carbonate, or bicarbonate ranging in concentration from about 0.1 N to about 2.0 N.

12. The method of claim 11 wherein the alkaline solution is an aqueous solution of NaOH ranging in concentration from about 0.5 to about 1.0 N.

* * * * *